United States Patent
Zhao et al.

(10) Patent No.: US 12,167,019 B2
(45) Date of Patent: Dec. 10, 2024

(54) TEMPORAL MOTION VECTOR PREDICTOR WITH DISPLACEMENT

(71) Applicant: TENCENT AMERICA LLC, Palo Alto, CA (US)

(72) Inventors: Xin Zhao, Santa Clara, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/080,450

(22) Filed: Dec. 13, 2022

(65) Prior Publication Data

US 2024/0031592 A1    Jan. 25, 2024

Related U.S. Application Data

(60) Provisional application No. 63/391,219, filed on Jul. 21, 2022.

(51) Int. Cl.
*H04N 19/513* (2014.01)
*H04N 19/103* (2014.01)
(Continued)

(52) U.S. Cl.
CPC ........ *H04N 19/513* (2014.11); *H04N 19/103* (2014.11); *H04N 19/176* (2014.11); *H04N 19/184* (2014.11)

(58) Field of Classification Search
CPC .. H04N 19/513; H04N 19/103; H04N 19/176; H04N 19/184
(Continued)

(56) References Cited

U.S. PATENT DOCUMENTS

| 2018/0084260 A1 | 3/2018 | Chien et al. |
| 2021/0092425 A1 | 3/2021 | Li et al. |

(Continued)

FOREIGN PATENT DOCUMENTS

WO    2020/098753 A1    5/2020

OTHER PUBLICATIONS

International Search Report dated Apr. 12, 2023 in International Application No. PCT/US22/52800.
(Continued)

*Primary Examiner* — Dominic D Saltarelli
(74) *Attorney, Agent, or Firm* — Sughrue Mion, PLLC

(57) ABSTRACT

Method, apparatus, and non-transitory storage medium for coding and decoding video data using temporal motion vector prediction (TMVP) is provided. The method may include receiving video bitstream comprising one or more pictures; determining that the one or more pictures are to be predicted in a regular merge mode or an adaptive motion vector prediction (AMVP) mode. A displacement vector associated with a current block in a current picture is obtained, the displacement vector being signaled in the video bitstream to identify a reference block in the current picture. A TMVP candidate list comprising the motion information is generated and a motion vector for the current block using the TMVP candidate list is derived. Then the current block is decoded using the derived motion vector for prediction in the regular merge mode or the adaptive motion vector prediction (AMVP) mode.

20 Claims, 16 Drawing Sheets

(51) Int. Cl.
*H04N 19/176* (2014.01)
*H04N 19/184* (2014.01)

(58) Field of Classification Search
USPC .................................................. 375/240.16
See application file for complete search history.

(56) References Cited

U.S. PATENT DOCUMENTS

| | | |
|---|---|---|
| 2021/0400299 A1 | 12/2021 | Zhu et al. |
| 2022/0150471 A1* | 5/2022 | Bae ..................... H04N 19/52 |
| 2024/0064311 A1* | 2/2024 | Astola .................. H04N 19/59 |

OTHER PUBLICATIONS

Written Opinion dated Apr. 12, 2023 in International Application No. PCT/US22/52800.

* cited by examiner

1100

1200

1300

1400

1500

1600

1700

1800

200

300

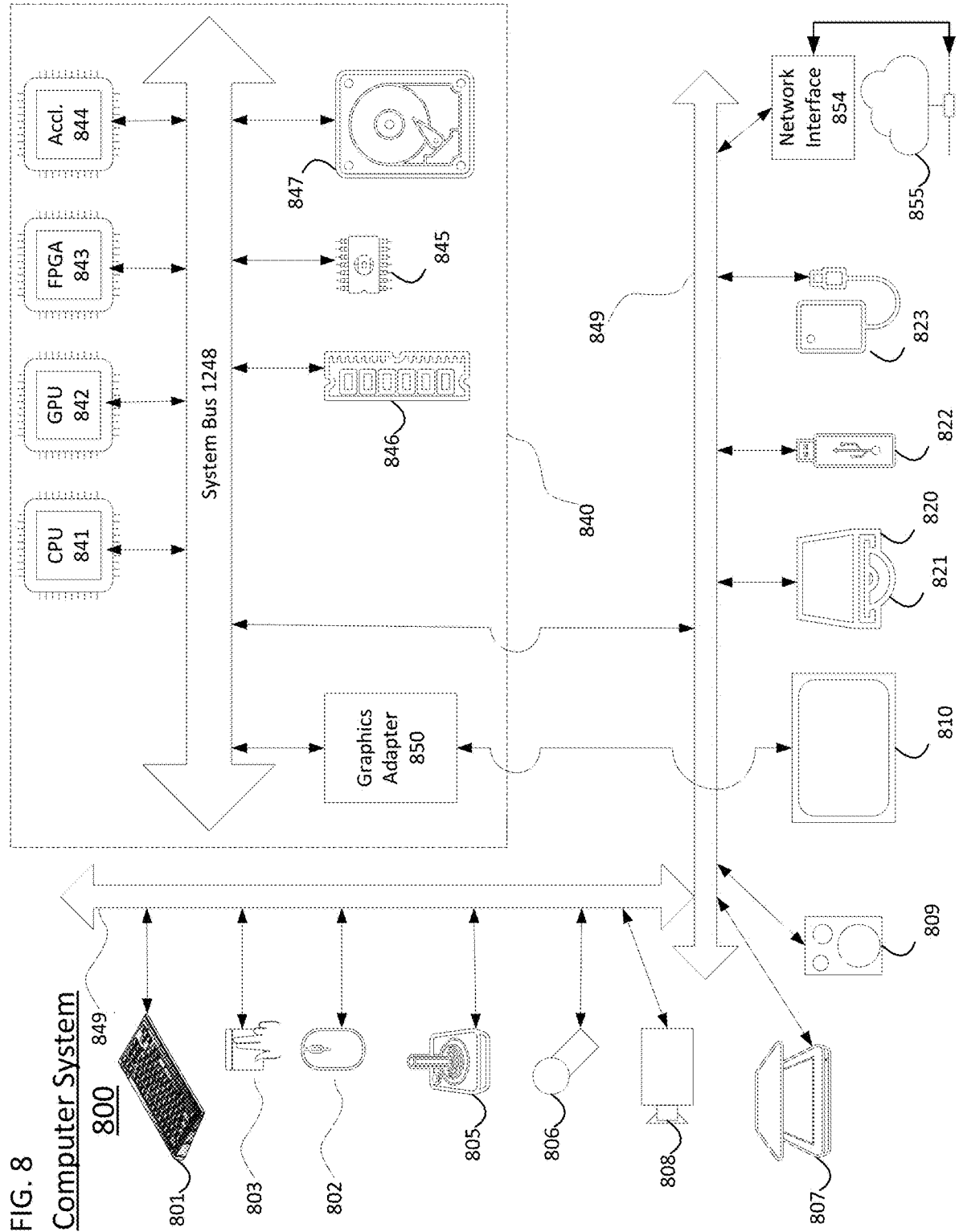

TEMPORAL MOTION VECTOR PREDICTOR WITH DISPLACEMENT

CROSS-REFERENCE TO RELATED APPLICATION

This application claims priority from U.S. Provisional Patent Application No. 63/391,219, filed on Jul. 21, 2022, in the United State Patent and Trademark Office, the disclosure of which is incorporated herein by reference in its entirety.

FIELD

Embodiments of the present disclosure relate to image and video coding technologies. More specifically, embodiments of the present disclosure relate to the derivation of the temporal motion vector predictor (TMVP) by using a displacement vector.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, and the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

SUMMARY

According to embodiments, a method for coding or decoding video data using temporal motion vector prediction (TMVP) may be provided. The method may be executed by a processor, and may include receiving video bitstream comprising one or more pictures; determining that the one or more pictures are to be predicted in a regular merge mode or an adaptive motion vector prediction (AMVP) mode; obtaining a displacement vector associated with a current block in a current picture, the displacement vector being signaled in the video bitstream to identify a reference block in the current picture; determining motion information associated with the reference block based on the displacement vector, the motion information being used as a motion vector predictor (MVP) from a temporal motion vector predictor (TMVP) candidate; generating a TMVP candidate list comprising the motion information; deriving a motion vector for the current block using the TMVP candidate list; and decoding the current block using the derived motion vector for prediction in the regular merge mode or the adaptive motion vector prediction (AMVP) mode.

According to embodiments, an apparatus for coding or decoding video data using temporal motion vector prediction (TMVP) may be provided. The apparatus may include at least one memory configured to store program code; and at least one processor configured to read the program code and operate as instructed by the program code. The program code may include receiving code configured to cause the at least one processor to receive video bitstream comprising one or more pictures; determining code configured to cause the at least one processor to determine that the one or more pictures are to be predicted in a regular merge mode or an adaptive motion vector prediction (AMVP) mode; obtaining code configured to cause the at least one processor to obtain obtaining a displacement vector associated with a current block in a current picture, the displacement vector being signaled in the video bitstream to identify a reference block in the current picture; motion information code configured to cause the at least one processor to determine motion information associated with the reference block based on the displacement vector, the motion information being used as a motion vector predictor (MVP) from a temporal motion vector predictor (TMVP) candidate; generating configured to cause the at least one processor to generate a TMVP candidate list comprising the motion information; deriving configured to cause the at least one processor to derive a motion vector for the current block using the TMVP candidate list; and decoding configured to cause the at least one processor to decode the current block using the derived motion vector for prediction in the regular merge mode or the adaptive motion vector prediction (AMVP) mode.

According to embodiments, a non-transitory computer-readable medium storing instructions may be provided. The instructions, may include one or more instructions that, when executed by one or more processors of a device for coding or decoding video data using temporal motion vector prediction (TMVP), may cause the one or more processors to receive video bitstream comprising one or more pictures; determine that the one or more pictures are to be predicted in a regular merge mode or an adaptive motion vector prediction (AMVP) mode; obtain a displacement vector associated with a current block in a current picture, the displacement vector being signaled in the video bitstream to identify a reference block in the current picture; determine motion information associated with the reference block based on the displacement vector, the motion information being used as a motion vector predictor (MVP) from a temporal motion vector predictor (TMVP) candidate; generate a TMVP candidate list comprising the motion information; derive a motion vector for the current block using the TMVP candidate list; and decode the current block using the derived motion vector for prediction in the regular merge mode or the adaptive motion vector prediction (AMVP) mode.

BRIEF DESCRIPTION OF THE DRAWINGS

FIG. 8 is a diagram of a computer system, according to an embodiment of the present disclosure.

DETAILED DESCRIPTION

Figure 1A:
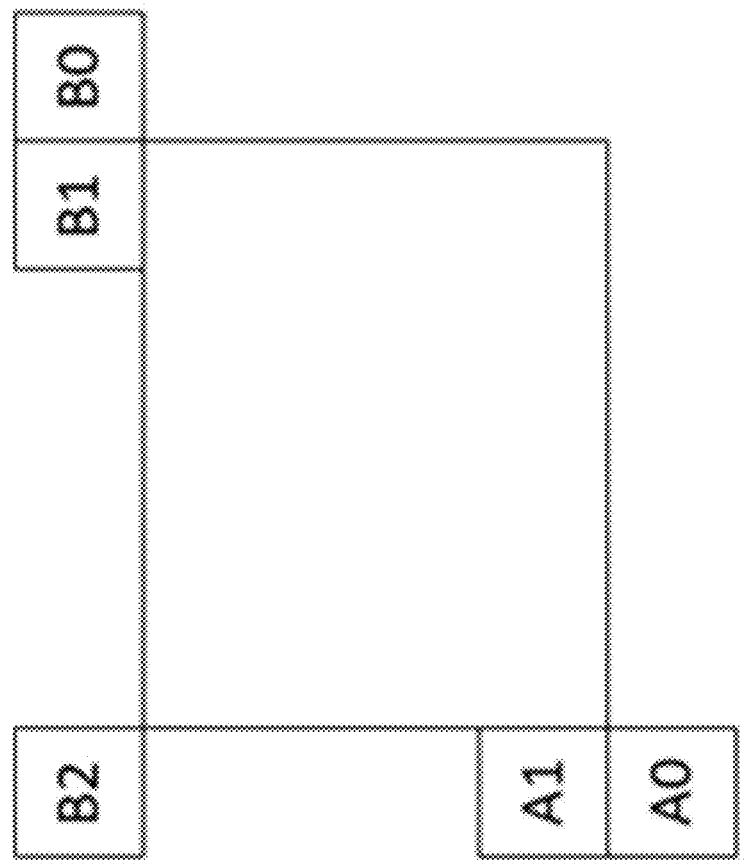
FIG. 1A illustrates examples of positions of special merge candidates, according to an embodiment of the present disclosure.

The proposed methods and processes may be used separately or in combination. Embodiments of the present disclosure relate to methods and systems to code or decode video data using temporal motion vector prediction (TMVP) using displacement vectors.

In related art, the block positions used to fetch the motion vector from TMVP candidate are predefined and fixed. Embodiments of the present disclosure are directed to an extra motion offset that is used to derive the motion vector for TMVP to improve the flexibility and efficiency of TMVP.

According to an aspect of the present disclosure, for TMVP candidate derivation used in regular Merge mode or AMVP modes, instead of using the pre-defined fixed positions for fetching the motion information used as the MVP from TMVP candidate, an additional or extra offset, namely displacement offset, may be signaled to identify a block in a reference picture, and the motion information associated with this identified block is used as the MVP from TMVP candidate. As an example, for a current block, one or more displacement vectors may be added to the current block to identify multiple block positions. The motion vectors associated with these identified block positions in reference picture can be used as the temporal motion vector predictor.

In an embodiment, the displacement vector may be signalled by an index using the merged motion vector difference (MMVD) method. In an embodiment, the displacement vector may be signaled using similar method as motion vector difference signaling with Adaptive Motion Vector Resolution (AMVR). The displacement vector resolution may be in N samples, e.g. N may be equal to 1, 4, or 8, etc. In an embodiment, the displacement vector resolution may be signaled by a high level syntax, such as at sequence level, picture level, slice level, or tile/tile-group level. In an embodiment, the displacement vector resolution may be signaled by a resolution index at block level. The resolution index may be used to look up displacement vector in a resolution table. In some embodiments, the resolution table may be predefined. In some embodiments, the resolution table may be signaled at high level, e.g. in sequence level, picture level, etc.

In an embodiment, a template-matching based reordering of the index of displacement vector may be applied to reorder the displacement offset index by using the template-matching cost in ascending order or descending order. In an example, first N candidates with the template-matching cost in ascending order may be used, with the N value being greater than or equal to 1, and not greater than the total number of the available candidates.

In an embodiment, the candidate positions indicated by different displacement vectors may be scanned in a pre-defined order, the first N candidate positions associated with a block coded using a motion vector may be identified, and the index among these N candidate positions may be signalled to indicate which one of the candidates is used as the TMVP candidate block position. In some embodiments, the pre-defined scan order may be determined by the relative distance between the candidate position and the starting point position.

Figure 2:
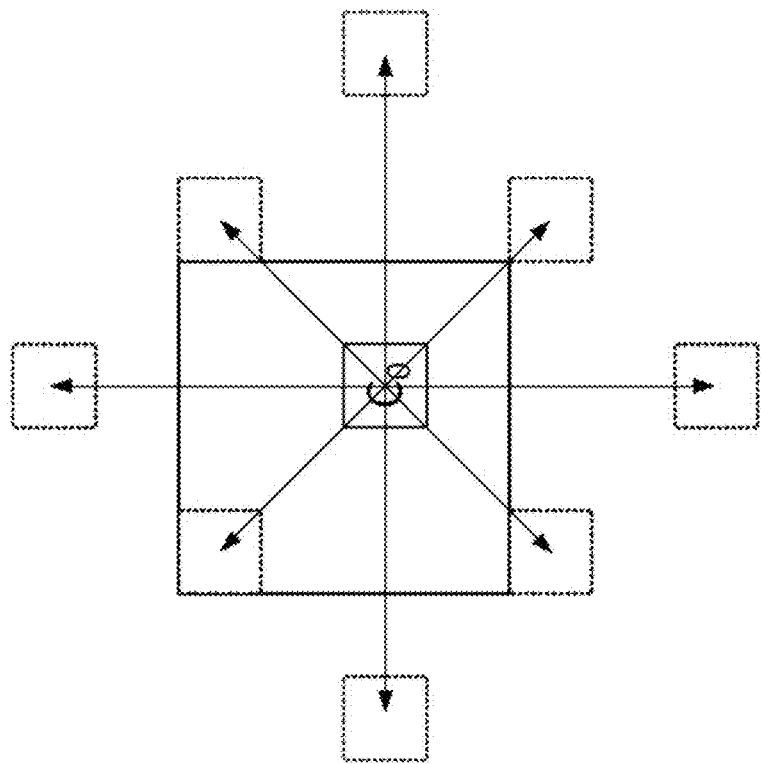
FIG. 2 illustrates an example block diagram of a plurality of displacement vectors used to code or decode video data using temporal motion vector prediction (TMVP) using displacement vectors, according to an embodiment of the present disclosure.

In an embodiment, the initial position may refer to the candidate position with zero displacement vector, the starting point position can be either default position, e.g., $C_0$ in FIG. 2, or implicitly derived by coded information, including, but not limited to the selected candidate block position of neighboring block coded using TMVP, the neighboring blocks motion vectors.

In an embodiment, the motion vector used as the TMVP may be derived as the average or weighted average of MVs fetched from multiple block positions in the reference picture. In an embodiment, the motion vector used as TMVP may be derived as the motion vector value with the highest count among all the motion vectors fetched from multiple block positions in the reference picture.

It may be understood that the methods and processes disclosed herein may be extended to multiple co-located pictures, by extending the said overlapped sub-blocks in motion field from one co-located picture to multiple co-located pictures.

Inter Prediction in VVC

For each inter-predicted coding unit (CU), motion parameters may consist of motion vectors, reference picture indices and reference picture list usage index, and additional information needed for the new coding feature of VVC to be used for inter-predicted sample generation. The motion parameters may be signaled in an explicit or implicit manner. When a CU is coded with skip mode, the CU may be associated with one PU and may have no significant residual coefficients, no coded motion vector delta or reference picture index. A merge mode may be specified whereby the motion parameters for the current CU are obtained from neighboring CUs, including spatial and temporal candidates, and additional schedules introduced in VVC. The merge mode may be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Extended Merge Prediction

In VTM4, the merge candidate list is constructed by including the following five types of candidates in order— (1) Spatial MVP from spatial neighbour CUs; (2) Temporal MVP from co-located CUs; (3) History-based MVP from an FIFO table; (4) Pairwise average MVP; and (5) Zero MVs. The size of merge list may be signalled in slice header and the maximum allowed size of merge list may be 6 in VTM4. For each CU code in merge mode, an index of best merge candidate is encoded using truncated unary binarization (TU). The first bin of the merge index is coded with context and bypass coding is used for other bins.

Spatial Candidate Derivation

Figure 1B:
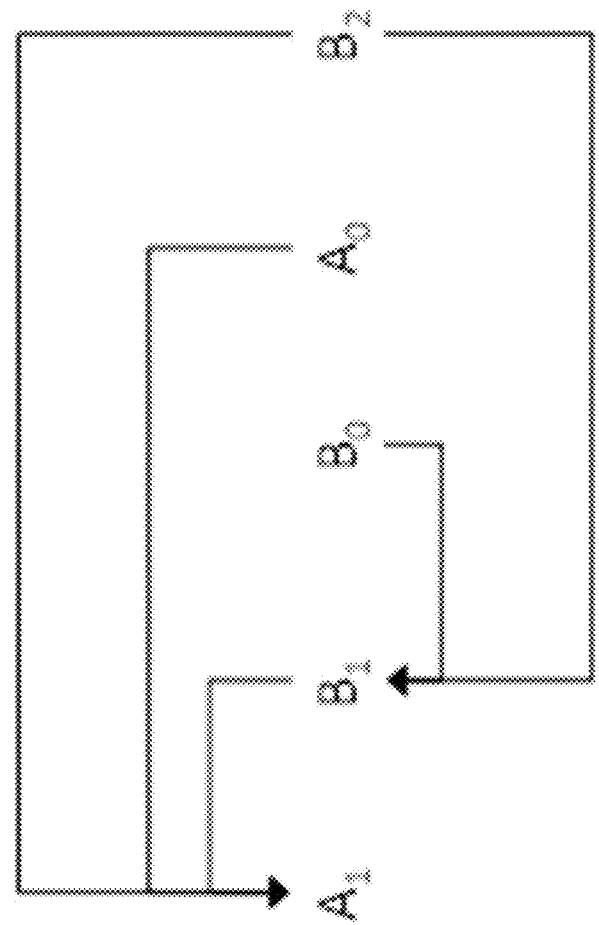
FIG. 1B illustrates examples of candidate pairs considered for redundancy check of spatial merge candidates, according to an embodiment of the present disclosure

The derivation of spatial merge candidates in VVC is similar to that in HEVC. A maximum of four merge candidates may be selected among candidates. FIG. 1A illustrates a current block 1100 indicating exemplary positions of merge candidates $B_1$, $A_1$, $B_0$, $A_0$, and $B_2$. In some embodiments, the order of derivation may be $B_1$, $A_1$, $B_0$, $A_0$, and $B_2$. Position $B_2$ may be considered only when any CU of position $A_0$, $B_0$, $B_1$, $A_1$ is not available (e.g. because it belongs to another slice or tile) or is intra coded. After candidate at position $A_1$ is added, the addition of the remaining candidates may be subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow as shown in FIG. 1B may be considered and a candidate may only added to the list if the corresponding candidate used for redundancy check has not the same motion information.

Temporal Candidate Derivation

Figure 1C:
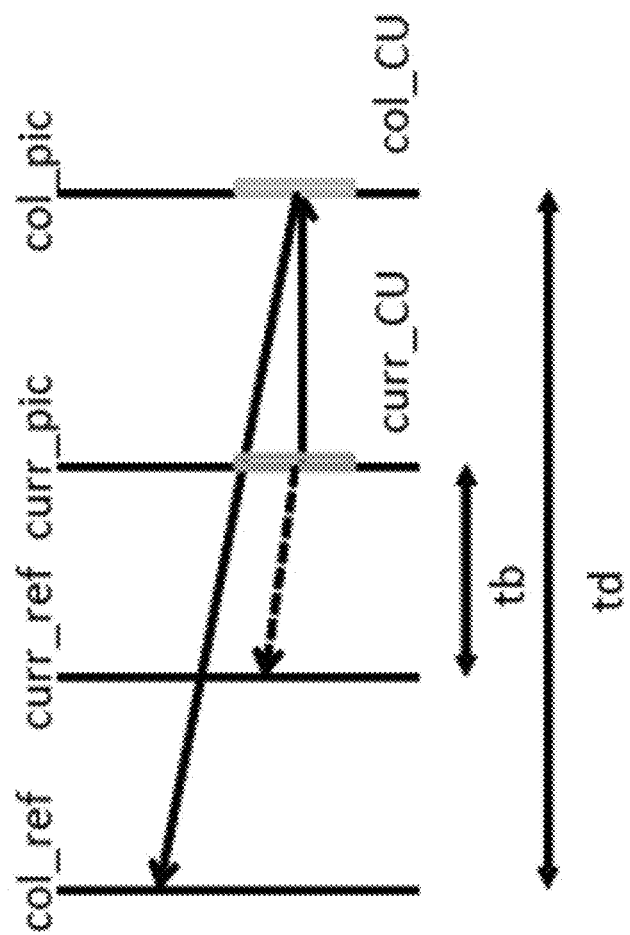
FIG. 1C illustrates an example of motion vector scaling for temporal merge candidate, according to an embodiment of the present disclosure.

In some embodiments, when deriving temporal candidates, only one candidate may be added to the list. Particularly, in the derivation of a temporal merge candidate, a scaled motion vector may be derived based on co-located CU belonging to the co-located reference picture. The reference picture list to be used for derivation of the co-located CU may be explicitly signaled in the slice header. The scaled motion vector for temporal merge candidate may be obtained as illustrated in FIG. 1C, and may be scaled from the motion vector of the co-located CU. As shown in FIG. 1C, the scaled motion vector for temporal merge candidate may be obtained and scaled from the motion vector of the co-located CU based on Picture Order Count (POC) distances tb and td, with tb being the POC difference between the reference picture of the current picture and the current picture, and td being the POC difference between the reference picture of the co-located picture and the co-located picture. The reference picture index of temporal merge candidate may be set equal to zero.

Figure 1D:
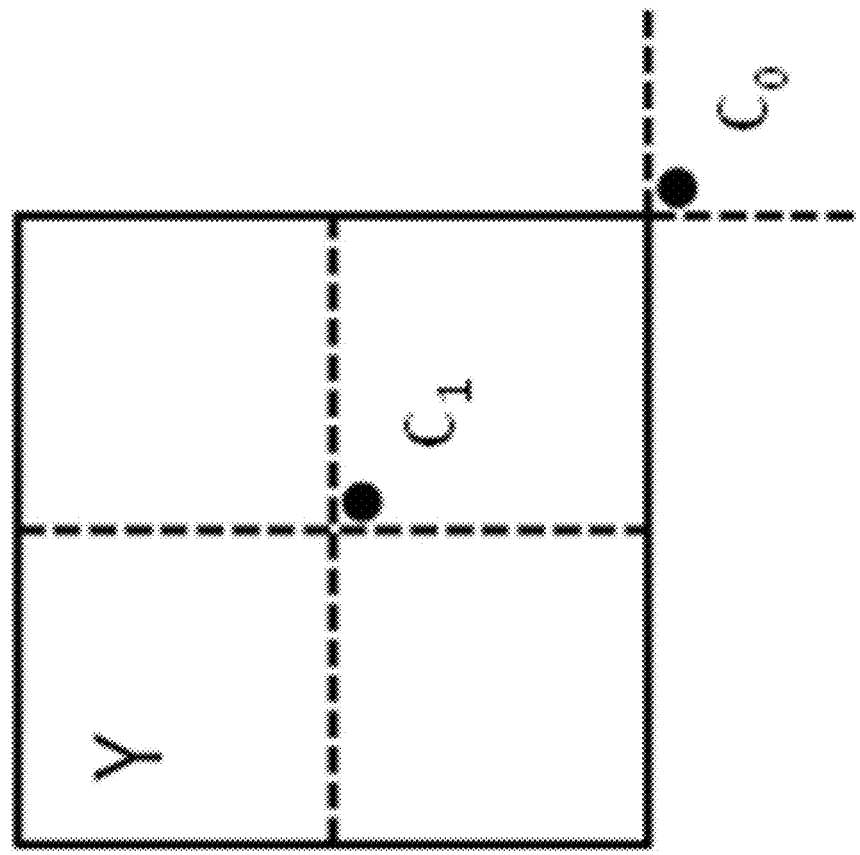
FIG. 1D illustrates examples of positions for temporal merge candidates, according to an embodiment of the present disclosure.

As shown in FIG. 1D, the position for the temporal candidate is selected between candidates $C_0$ and $C_1$. In some embodiments, if CU at position $C_0$ is not available, is intra coded, or is outside of the current row of Coding Tree Units (CTUs), position $C_1$ may be used. Otherwise, position $C_0$ may be used in the derivation of the temporal merge candidate.

Merge with Motion Vector Difference (MMVD)

Figure 1E:
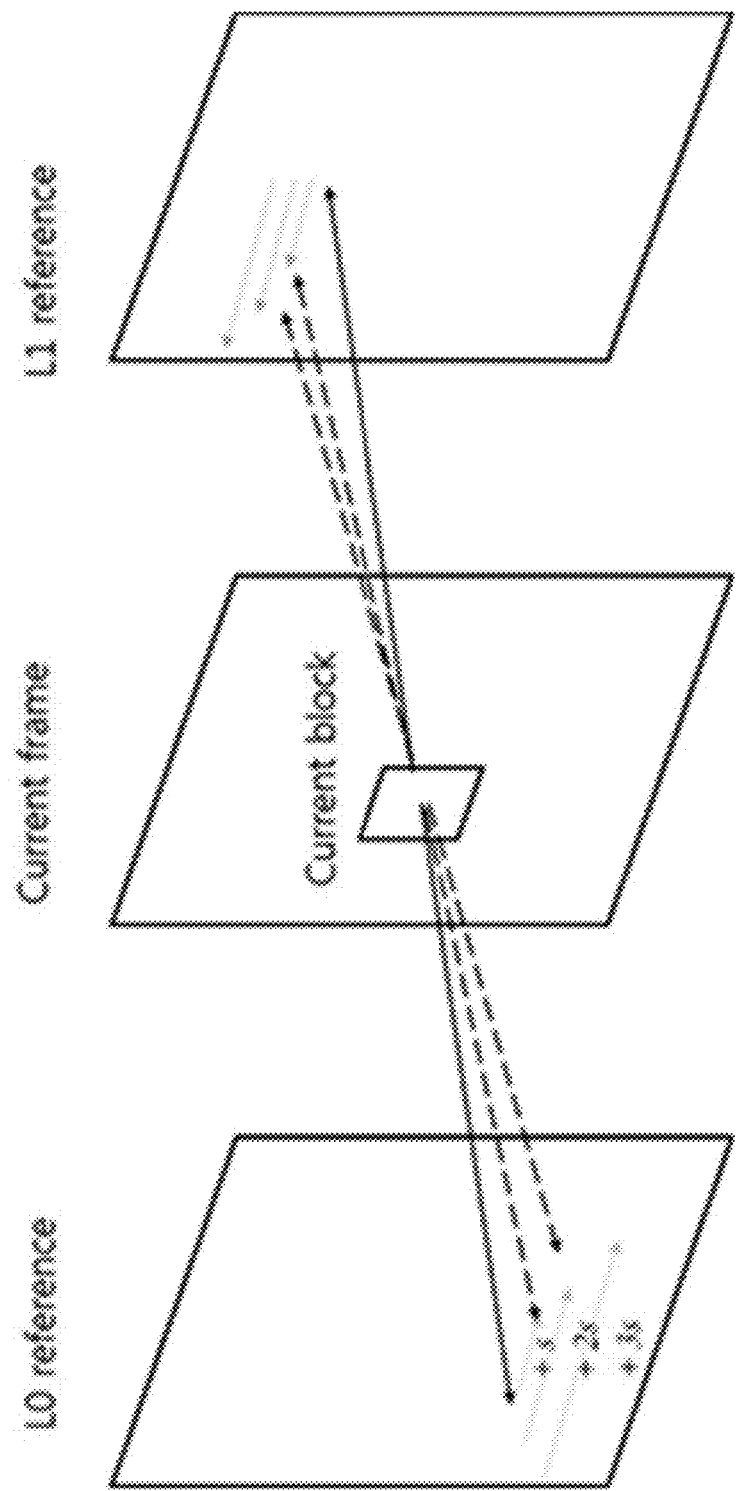
FIG. 1E illustrates an example process for merge with motion vector difference (MMVD) search, according to an embodiment of the present disclosure.
Figure 1F:
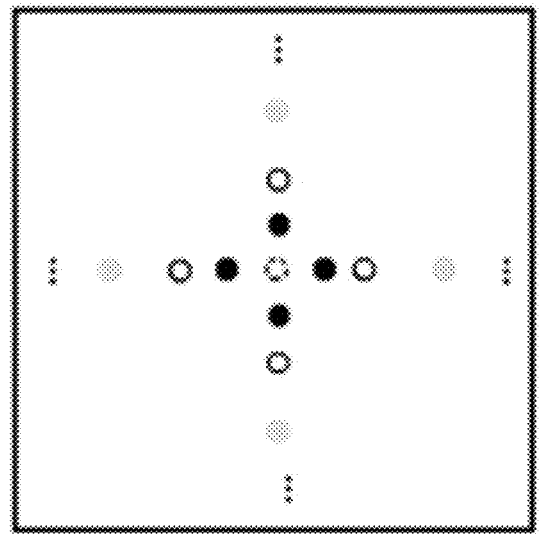
FIG. 1F illustrates exemplary merge with motion vector difference search point, according to an embodiment of the present disclosure.
Figure 1F:
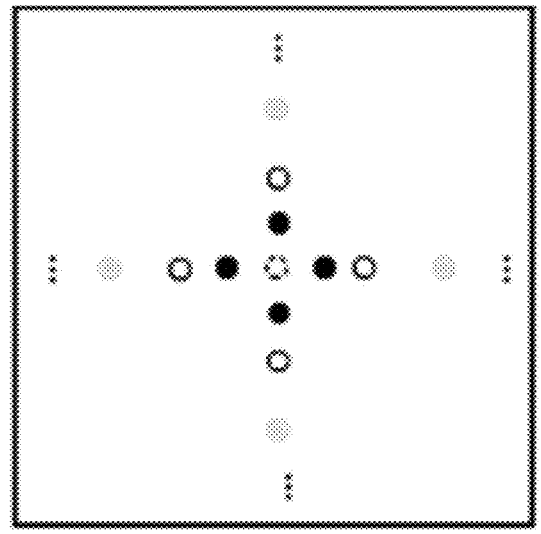

Merge with MMVD may be used for either skip or merge modes with a motion vector expression method. MMVD may re-use merge candidates in VVC. Among the merge candidates, a candidate may be selected, and may further expanded by the proposed motion vector expression method as shown in FIG. 1E and FIG. 1F. MMVD may provide a new motion vector expression with simplified signaling. The expression method may include starting point, motion magnitude, and motion direction.

MMVD technique may use a merge candidate list in VVC. But only candidates which are default merge type (MRG_TYPE_DEFAULT_N) may be considered for MMVD's expansion. Base candidate index defines the starting point. Base candidate index indicates the best candidate among candidates in the list as indicated in Table 1 herein.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate DX may not be signaled. Distance index is motion magnitude information. Distance index indicates the predefined distance from the starting point information. Predefined distance may be as indicated in Table 2 herein.

TABLE 2

| Distance IDX | | | | | | | | |
|---|---|---|---|---|---|---|---|---|
| Distance IDX | | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index may represent the direction of the MMVD relative to the starting point. The direction index may represent of the four directions as shown bin Table 3 herein.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

In some embodiments, MMVD flag may be signaled right after sending a skip flag and merge flag. If skip and merge flag are true, MMVD flag is parsed. If MMVD flage is equal to 1, MMVD syntaxes are parsed. But, if not 1, AFFINE flag is parsed. If AFFINE flag is equal to 1, that is AFFINE mode, but, if not 1, skip/merge index is parsed for VTM's skip/merge mode.

Template Matching Based Candidate Reordering on MMVD and Affine MMVD

Figure 1G:
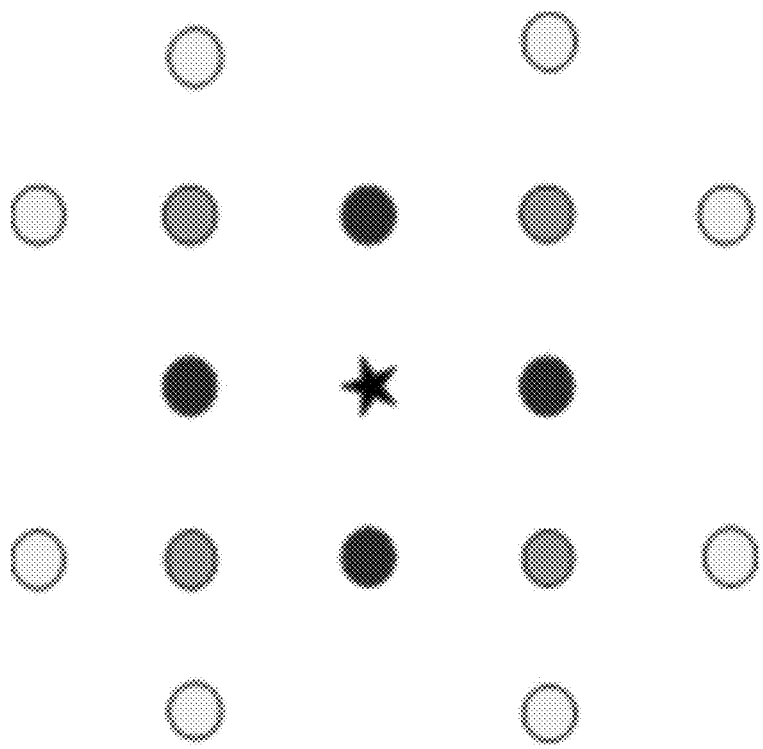
FIG. 1G illustrates example additional directions along diagonal angles, according to an embodiment of the present disclosure.

In related art, MMVD offsets may be extended for MMVD and affine MMVD modes. Additional refinement positions along k×π/8 diagonal angles may be added shown in FIG. 1G, thus increasing the number of directions from 4 to 16. In addition, based on the sum of absolute different (SAD) cost between the template (one row above and one column left to the current block) and its reference for each refinement position, all the possible MMVD refinement positions (16×6) for each base candidate may be reordered. In some embodiments, the top ⅛ refinement positions with the smallest template SAD costs are kept as available positions, consequently for MMVD index coding. The MMVD index may be binarized by the rice code with the parameter equal to 2.

In an aspect of the present disclosure, on top of the MMVD extension as described herein, affine MMVD reordering may also be extended, in which additional refinement positions along k×π/4 diagonal angles may be added. After reordering top ½ refinement positions with the smallest template SAD costs may be kept.

Subblock-Based TMVP (SbTMVP)

To improve the coding efficiency and reduce the transmission overhead of motion vector, the sub-block level motion vector refinement may be applied to extend the CU level temporal motion vector prediction (TMVP). The sub-block-based TMVP (SbTMVP) allows inheriting the motion information at subblock-level from the co-located reference picture. Each sub-block of a large size CU may have its own motion information without explicitly transmitting the block partition structure or motion information. SbTMVP may obtain motion information for each sub-block as follows. Firstly, SbTMVP may include the derivation of displacement vector (DV) of the current CU. And then, based on the availability of the SbTMVP candidate, derive the central motion. Finally, SbTMVP may include deriving the sub-block motion information from the corresponding sub-block by the DV. Unlike TMVP candidate derivation which always derives the temporal motion vectors from the co-located block in the reference frame, SbTMVP may apply a DV which is derived from the motion vector (MV) of the left neighboring CU of the current CU to find the corresponding sub-block in the co-located picture for each sub-block of the current CU. In case the corresponding sub-block is not inter-coded, the motion information of the current sub-block may be set to be the central motion.

VVC supports the sub-block-based temporal motion vector prediction (SbTMVP) method. Similar to the temporal motion vector prediction (TMVP) in HEVC, SbTMVP uses the motion field in the co-located picture to improve motion vector prediction and merge mode for CUs in the current picture. The same co-located picture used by TMVP is used for SbTMVP. SbTMVP differs from TMVP in the following two main aspects:

(1) TMVP predicts motion at CU level but SbTMVP predicts motion at sub-CU level; and (2) while TMVP fetches the temporal motion vectors from the co-located block in the co-located picture (the co-located block is the bottom-right or center block relative to the current CU), SbTMVP applies a motion shift before fetching the temporal motion information from the co-located picture, where the motion shift (also referred to as displacement vector or DV) is obtained from the motion vector from one of the spatial neighboring blocks of the current CU.

Figure 1H:
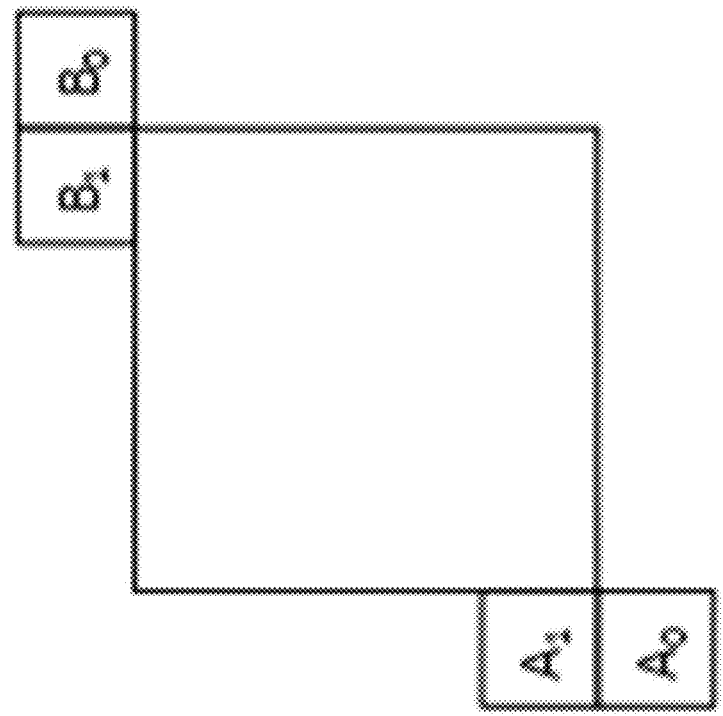
FIG. 1H illustrates exemplary spatial neighboring blocks used by ATVMP, according to an embodiment of the present disclosure.

FIG. 1H illustrates an exemplary SbTMVP candidate selection using spatial neighboring blocks. SbTMVP predicts the motion vectors of the sub-CUs within the current CU in two parts. As a first part, the spatial neighbor $A_1$ in FIG. 1H is examined. If $A_1$ has a motion vector that uses the co-located picture as its reference picture, this motion vector is selected to be the motion shift (or displacement vector) to be applied. If no such motion is identified, then the motion shift is set to (0, 0).

Figure 1I:
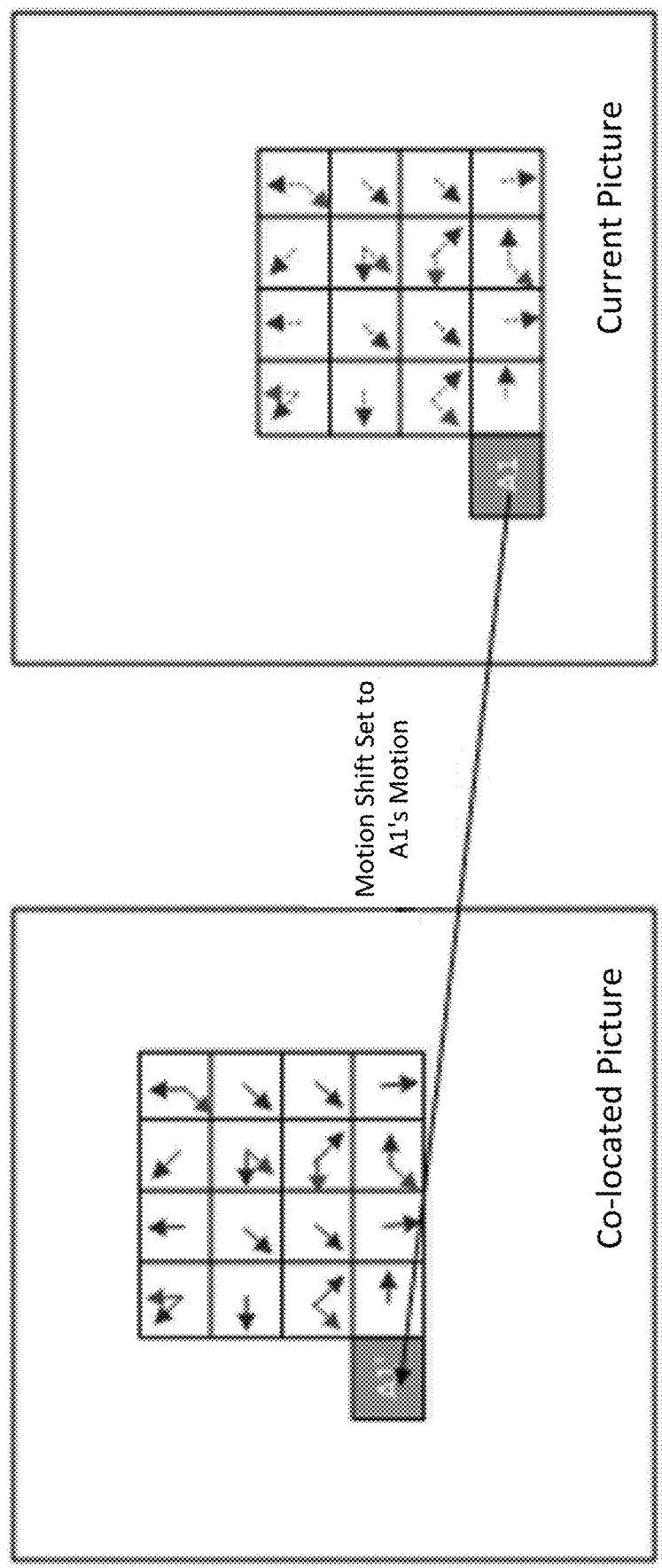
FIG. 1I illustrates an example process for deriving sub-CU motion field based on a motion shift from spatial neighbors, according to an embodiment of the present disclosure.

As a second part, the motion shift identified in part one may be applied (i.e. added to the current block's coordinates) to obtain sub-CU-level motion information (motion vectors and reference indices) from the co-located picture as shown in FIG. 1I. As shown in FIG. 1I, an assumption is made that the motion shift is set to block $A_1$'s motion. Then, for each sub-CU, the motion information of its corresponding block (the smallest motion grid that covers the center sample) in the co-located picture is used to derive the motion information for the sub-CU. After the motion information of the co-located sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined sub-block based merge list which contains both SbTMVP candidate and affine merge candidates is used for the signaling of sub-block based merge mode. The SbTMVP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signaled in SPS and the maximum allowed size of the sub-block based merge list is 5 in VVC.

In VVC, the sub-CU size used in SbTMVP is fixed to be 8×8, and as done for affine merge mode, SbTMVP mode is only applicable to the CU with both width and height are larger than or equal to 8. The sub-block size may be configurable to other sizes, such as 4×4, in the ECM software model use for exploration beyond VVC.

FIG. 2 illustrates an example block diagram 200 of a plurality of displacement vectors used to code or decode video data using temporal motion vector prediction (TMVP) using displacement vectors, according to an embodiment of the present disclosure.

Embodiments of the present disclosure are directed to an extra motion offset that is used to derive the motion vector for TMVP to improve the flexibility and efficiency of TMVP.

According to an aspect of the present disclosure, for TMVP candidate derivation used in regular Merge mode or AMVP modes, instead of using the pre-defined fixed positions for fetching the motion information used as the MVP from TMVP candidate, an additional or extra offset, namely displacement offset, may be signaled to identify a block in a reference picture, and the motion information associated with this identified block is used as the MVP from TMVP candidate. As an example, for a current block $C_0$, one or more displacement vectors (indicated by solid arrows in FIG. 2) may be added to the current block $C_0$ to identify multiple block positions (indicated by dashed boxes in FIG. 2). The motion vectors associated with these identified block positions in reference picture can be used as the temporal motion vector predictor.

In an embodiment, the displacement vector may be signalled by an index using the merged motion vector difference (MMVD) method. In an embodiment, the displacement vector may be signaled using similar method as motion vector difference signaling with Adaptive Motion Vector Resolution (AMVR). The displacement vector resolution may be in N samples, e.g. N may be equal to 1, 4, or 8, etc. In an embodiment, the displacement vector resolution may be signaled by a high level syntax, such as at sequence level, picture level, slice level, or tile/tile-group level. In an embodiment, the displacement vector resolution may be signaled by a resolution index at block level. The resolution index may be used to look up displacement vector in a resolution table. In some embodiments, the resolution table may be predefined. In some embodiments, the resolution table may be signaled at high level, e.g. in sequence level, picture level, etc.

In an embodiment, a template-matching based reordering of the index of displacement vector may be applied to reorder the displacement offset index by using the template-matching cost in ascending order or descending order. In an example, first N candidates with the template-matching cost in ascending order may be used, with the N value being greater than or equal to 1, and not greater than the total number of the available candidates.

In an embodiment, the candidate positions indicated by different displacement vectors may be scanned in a pre-defined order, the first N candidate positions associated with a block coded using a motion vector may be identified, and the index among these N candidate positions may be signalled to indicate which one of the candidates is used as the TMVP candidate block position. In some embodiments, the pre-defined scan order may be determined by the relative distance between the candidate position and the starting point position. As an example, the initial position may refer to the candidate position with zero displacement vector, e.g., $C_0$ in FIG. 2.

In an embodiment, the initial position may refer to the candidate position with zero displacement vector, the starting point position can be either default position, e.g., $C_0$ in FIG. 2, or implicitly derived by coded information, including, but not limited to the selected candidate block position of neighboring block coded using TMVP, the neighboring blocks motion vectors.

In an embodiment, the motion vector used as the TMVP may be derived as the average or weighted average of MVs fetched from multiple block positions in the reference picture. In an embodiment, the motion vector used as TMVP may be derived as the motion vector value with the highest count among all the motion vectors fetched from multiple block positions in the reference picture.

Figure 3:
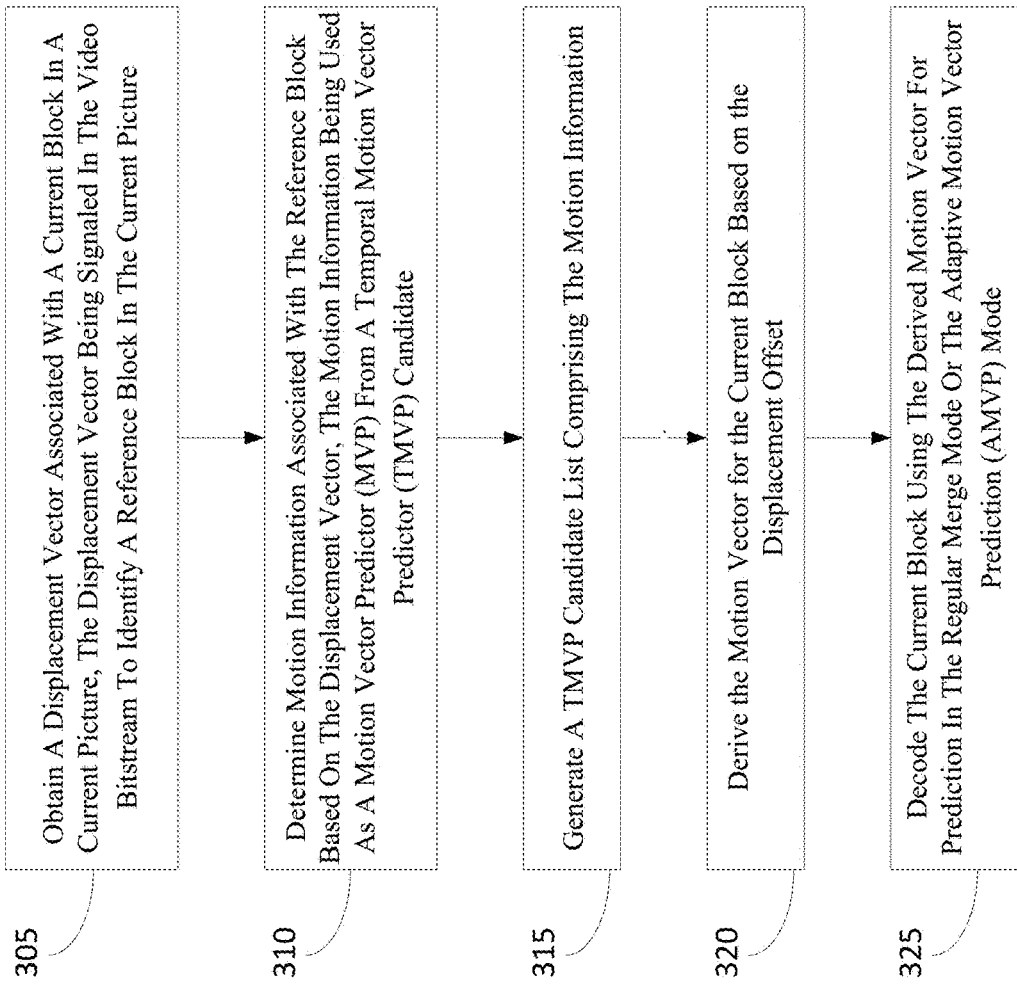
FIG. 3 is a flowchart of an example process for coding and/or decoding video data using temporal motion vector prediction (TMVP) using displacement vectors, according to an embodiment of the present disclosure.

FIG. 3 is a flowchart of an example process for coding and/or decoding video data using temporal motion vector prediction (TMVP) using displacement vectors, according to an embodiment of the present disclosure.

As shown in FIG. 3, at operation 305, a displacement vector associated with a current block in a current picture may be obtained, the displacement vector being signaled in the video bitstream to identify a reference block in the current picture. As an example, as shown in FIG. 2, a plurality of displacement vectors may be obtained and added to a block $C_0$ (the displacement vectors may be indicated using the arrows).

In some embodiments, operation 305 may include receiving video bitstream comprising one or more pictures. Operation 305 may also include determining that the one or more pictures are to be predicted in a regular merge mode or an adaptive motion vector prediction (AMVP) mode. In some embodiments, the displacement vector or offset indicates at least one respective position of the at least one motion vector predictor in the temporal motion vector predictor candidate list. In some embodiments, the displacement vector or offset indicates at least one respective displacement vector among the plurality of displacement vectors associated with respective candidates in the temporal motion vector predictor candidate list.

At operation 310, motion information associated with the reference block may be determined based on the displacement vector, the motion information being used as a motion vector predictor (MVP) from a temporal motion vector predictor (TMVP) candidate.

According to an aspect of the present disclosure, the temporal motion vector predictor candidate list may be reordered based on a template matching cost. In some embodiments, the temporal motion vector predictor candidate list may be generated using a pre-defined scan order, and the pre-defined scan order may be based on a magnitude of a displacement vector among the plurality of displacement vectors.

At operation 315, a TMVP candidate list comprising the motion information may be generated. At operation 320, a motion vector may be derived for the current block using the TMVP candidate list.

At operation 325, the current block may be decoded using the derived motion vector for prediction in the regular merge mode or the adaptive motion vector prediction (AMVP) mode.

In some embodiments, during encoding, a displacement offset associated with at least one motion vector predictor among the temporal motion vector predictor candidate list to be used in deriving a motion vector for the current block using TMVP may be signaled. As an example, the displacement offset may be signaled as an index using motion vector difference with motion vector expression techniques or using motion vector difference with adaptive motion vector resolution techniques. When using motion vector difference with adaptive motion vector resolution techniques, the plurality of displacement vectors may have a displacement vector resolution in a specific number of samples and the displacement vector resolution may be signaled in a high level syntax.

Although FIG. 3 show example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

Figure 4:
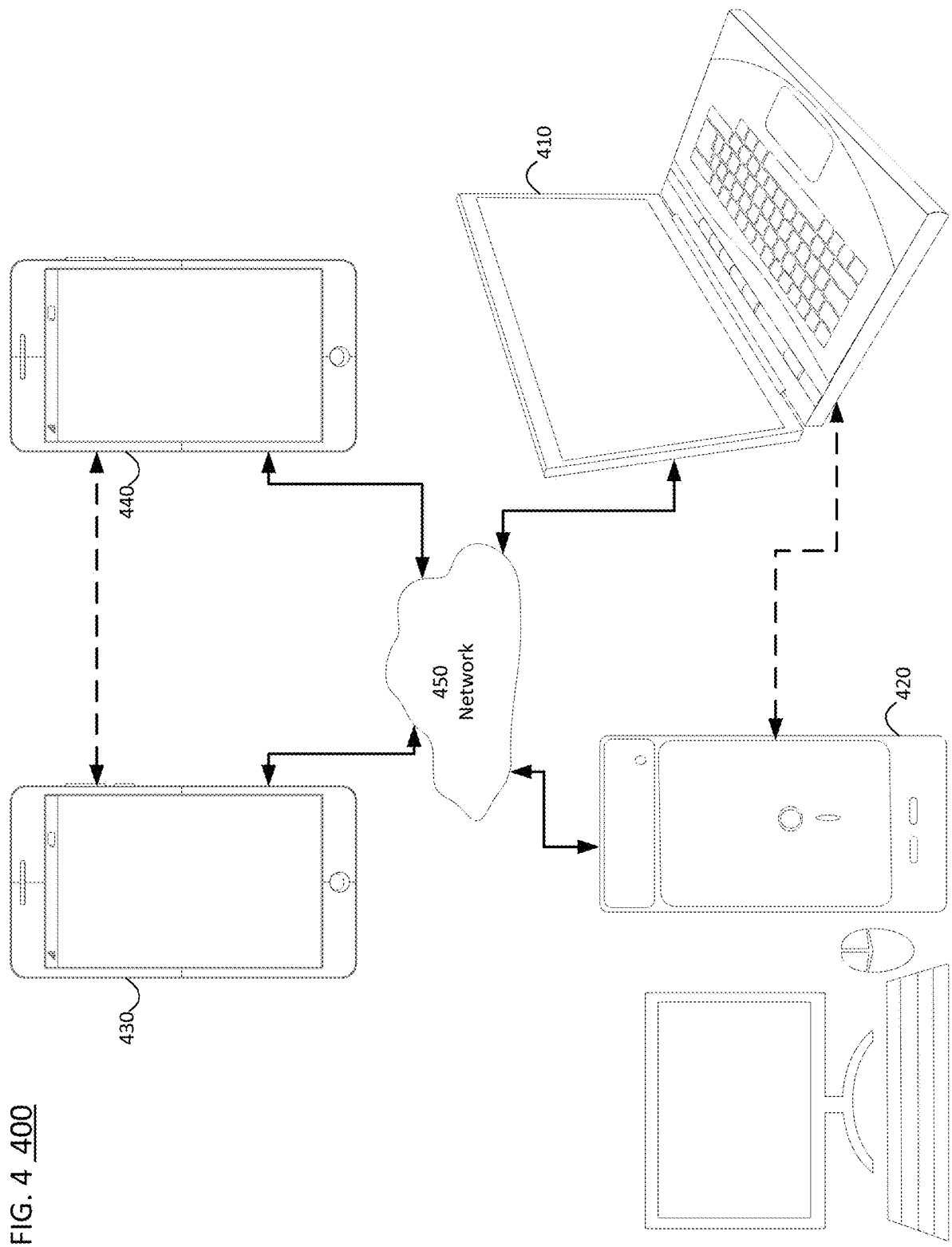
FIG. 4 is a simplified block diagram of a communication system, according to an embodiment of the present disclosure.

FIG. 4 illustrates a simplified block diagram of a communication system 400 according to an embodiment of the present disclosure. The communication system 400 may include at least two terminals 410-420 interconnected via a network 450. For unidirectional transmission of data, a first terminal 410 may code video data at a local location for transmission to the second terminal 420 via the network 450. The second terminal 420 may receive the coded video data of the other terminal from the network 450, decode the coded data, and display the recovered video data. Unidirectional data transmission may be common in media serving applications and the like.

FIG. 4 illustrates a second pair of terminals 430, 440 provided to support bidirectional transmission of coded video that may occur, for example, during videoconferencing. For bidirectional transmission of data, each terminal 430, 440 may code video data captured at a local location for transmission to the other terminal via the network 450. Each terminal 430, 440 also may receive the coded video data transmitted by the other terminal, may decode the coded data and may display the recovered video data at a local display device.

In FIG. 4, the terminals 410-440 may be illustrated as servers, personal computers and smart phones but the principles of the present disclosure are not so limited. Embodiments of the present disclosure find application with laptop computers, tablet computers, media players and/or dedicated video conferencing equipment. The network 450 represents any number of networks that convey coded video data among the terminals 410-440, including for example wireline and/or wireless communication networks. The communication network 450 may exchange data in circuit-switched and/or packet-switched channels. Representative networks include telecommunications networks, local area networks, wide area networks, and/or the Internet. For the purposes of the present discussion, the architecture and topology of the network 450 may be immaterial to the operation of the present disclosure unless explained herein below.

Figure 5:
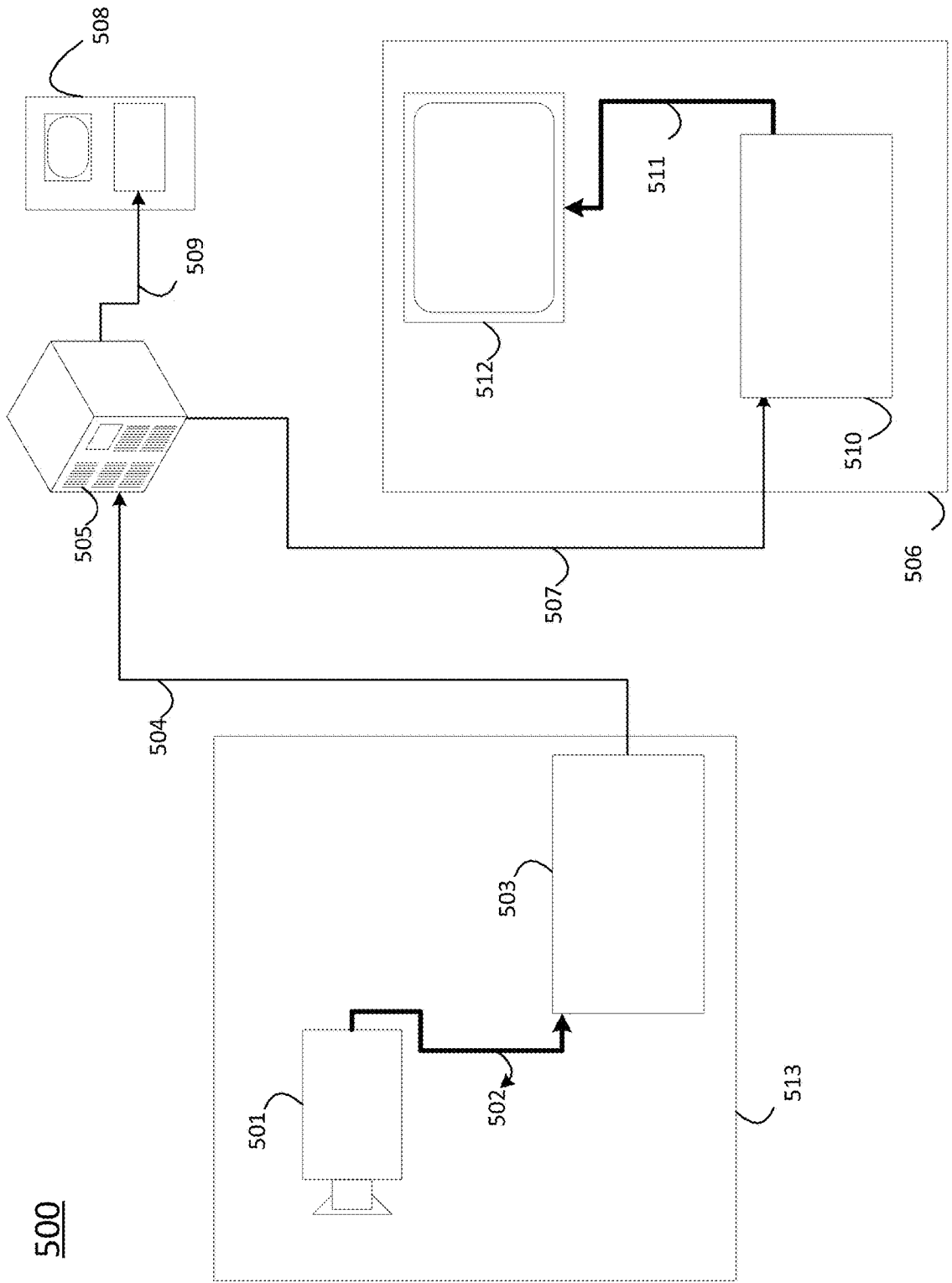
FIG. 5 is a diagram of the placement of a video encoder and decoder in a streaming environment.

FIG. 5 illustrates, as an example for an application for the disclosed subject matter, the placement of a video encoder and decoder in a streaming environment, for example streaming system 500. The disclosed subject matter may be equally applicable to other video enabled applications, including, for example, video conferencing, digital TV, storing of compressed video on digital media including CD, DVD, memory stick and the like, and so on.

A streaming system may include a capture subsystem 513, which may include a video source 501, for example a digital camera, creating, for example, an uncompressed video sample stream 502. That sample stream 502, depicted as a bold line to emphasize a high data volume when compared to encoded video bitstreams, may be processed by an encoder 503 coupled to the video source 501, which may be for example a camera. The encoder 503 may include hardware, software, or a combination thereof to enable or implement aspects of the disclosed subject matter as described in more detail below. The encoded video bitstream 504, depicted as a thin line to emphasize the lower data volume when compared to the sample stream, may be stored on a streaming server 505 for future use. One or more streaming clients 506, 508 may access the streaming server 505 to retrieve video bitstreams 507, 509, which may be for example copies of the encoded video bitstream 504. A client 506 may include a video decoder 510, which decodes the incoming copy of the encoded video bitstream 507 and creates an outgoing video sample stream 511 that may be rendered on a display 512 or other rendering device not depicted. In some streaming systems, the video bitstreams 504, 507, 509 may be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
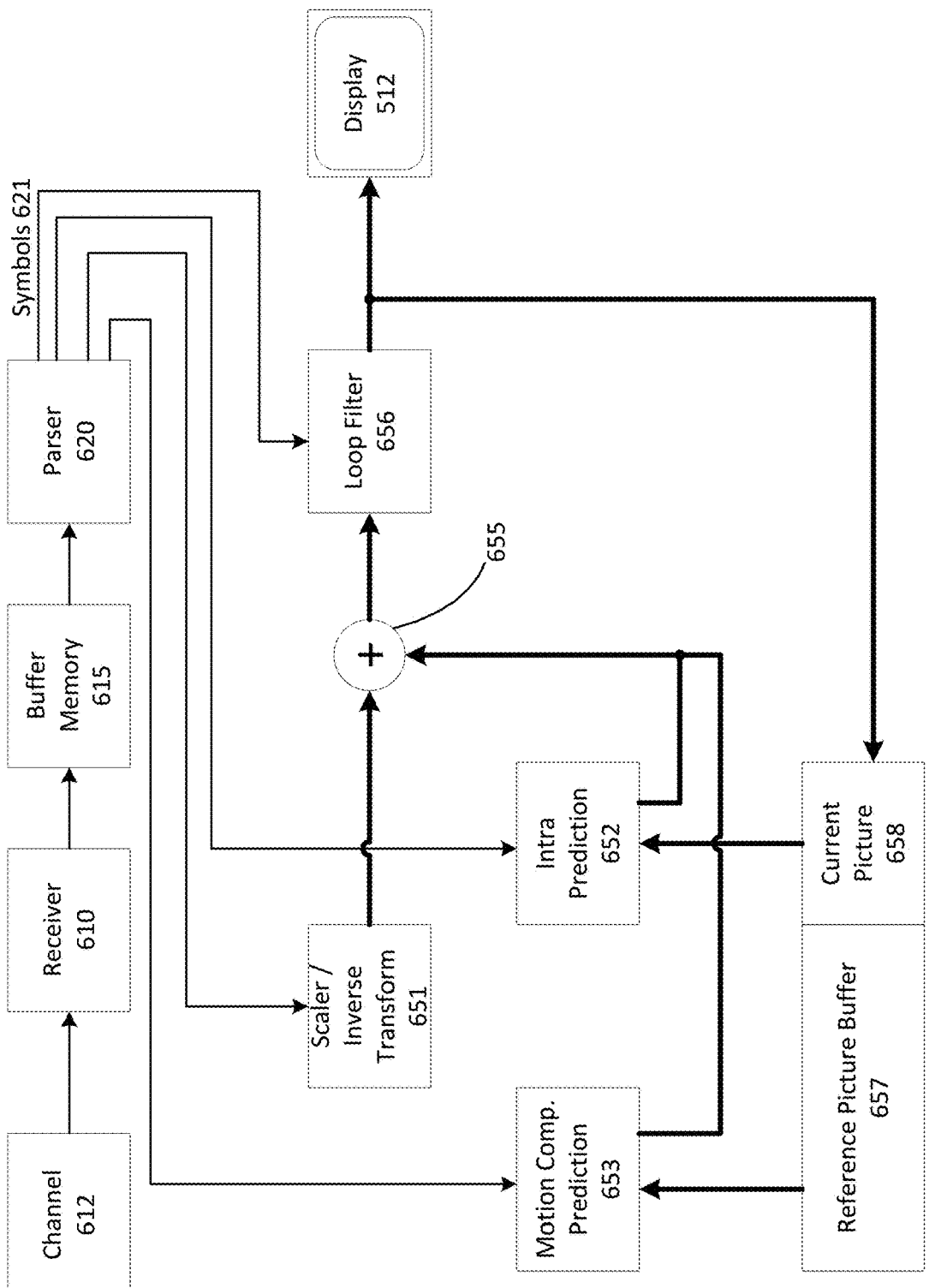
FIG. 6 is a functional block diagram of a video decoder, according to an embodiment of the present disclosure.

FIG. 6 may be a functional block diagram of a video decoder 510 according to an embodiment of the present disclosure.

A receiver 610 may receive one or more codec video sequences to be decoded by the decoder 510; in the same or another embodiment, one coded video sequence at a time, where the decoding of each coded video sequence is independent from other coded video sequences. The coded video sequence may be received from a channel 612, which may be a hardware/software link to a storage device, that stores the encoded video data. The receiver 610 may receive the encoded video data with other data, for example, coded audio data, and/or ancillary data streams, that may be forwarded to their respective using entities not depicted. The receiver 610 may separate the coded video sequence from the other data. To combat network jitter, a buffer 615, which may be for example a buffer memory, may be coupled in between receiver 610 and entropy decoder/parser 620 "parser" henceforth. When receiver 610 is receiving data from a store/forward device of sufficient bandwidth and controllability, or from an isosynchronous network, the buffer 615 may not be needed, or may be small. For use on best effort packet networks such as the Internet, the buffer 615 may be required, may be comparatively large, and may advantageously of adaptive size.

The video decoder 510 may include a parser 620 to reconstruct symbols 621 from the entropy coded video sequence. Categories of those symbols include information used to manage operation of the decoder 510, and potentially information to control a rendering device such as a display 512 that is not an integral part of the decoder but may be coupled to it, as was shown in FIG. 6. The control information for the rendering device(s may be in the form of Supplementary Enhancement Information SEI messages or Video Usability Information (VUI) parameter set fragments not depicted. The parser 620 may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser 620 may extract from the coded video sequence, a set of subgroup parameters for at least one of the subgroups of pixels in the video decoder, based upon at least one parameters corresponding to the group. Subgroups may include Groups of Pictures GOPs, pictures, tiles, slices, macroblocks, Coding Units CUs, blocks, Transform Units TUs, Prediction Units PUs and so forth. The entropy decoder/parser may also extract from the coded video sequence information such as transform coefficients, quantizer parameter QP values, motion vectors, and so forth.

The parser 620 may perform entropy decoding/parsing operation on the video sequence received from the buffer 615, so to create symbols 621. The parser 620 may receive encoded data, and selectively decode particular symbols 621. Further, the parser 620 may determine whether the particular symbols 621 are to be provided to a Motion Compensation Prediction unit 653, a scaler/inverse transform unit 651, an Intra Prediction Unit 652, or a loop filter unit 656.

Reconstruction of the symbols 621 may involve multiple different units depending on the type of the coded video picture or parts thereof such as inter and intra picture, inter and intra block, and other factors. Which units are involved, and how, may be controlled by the subgroup control information that was parsed from the coded video sequence by the parser 620. The flow of such subgroup control information between the parser 620 and the multiple units below is not depicted for clarity.

Beyond the functional blocks already mentioned, decoder 510 may be conceptually subdivided into a number of functional units as described below. In a practical implementation operating under commercial constraints, many of these units interact closely with each other and may, at least partly, be integrated into each other. However, for describing the disclosed subject matter, the conceptual subdivision into the functional units below is appropriate.

A first unit is the scaler/inverse transform unit 651. The scaler/inverse transform unit 651 receives quantized transform coefficient as well as control information, including which transform to use, block size, quantization factor, quantization scaling matrices, etc. as symbol(s 621 from the parser 620. It may output blocks comprising sample values that may be input into aggregator 655.

In some cases, the output samples of the scaler/inverse transform unit 651 may pertain to an intra coded block; that is: a block that is not using predictive information from previously reconstructed pictures, but may use predictive information from previously reconstructed parts of the current picture. An intra picture prediction unit 652 may provide such predictive information. In some cases, the intra picture prediction unit 652 generates a block of the same size and shape of the block under reconstruction, using surrounding already reconstructed information fetched from the current partly reconstructed picture 658. The aggregator 655, in some cases, adds, on a per sample basis, the prediction information the intra prediction unit 652 has generated to the output sample information as provided by the scaler/inverse transform unit 651.

In other cases, the output samples of the scaler/inverse transform unit 651 may pertain to an inter coded, and potentially motion compensated block. In such a case, a Motion Compensation Prediction unit 653 may access reference picture memory 657 to fetch samples used for prediction. After motion compensating the fetched samples in accordance with the symbols, the aggregator 655 to the output of the scaler/inverse may add 621 pertaining to the block, these samples transform unit in this case called the residual samples or residual signal so to generate output sample information. The addresses within the reference picture memory form where the motion compensation unit fetches prediction samples may be controlled by motion vectors, available to the motion compensation unit in the form of symbols 621 that may have, for example X, Y, and reference picture components. Motion compensation also may include interpolation of sample values as fetched from the reference picture memory when sub-sample exact motion vectors are in use, motion vector prediction mechanisms, and so forth.

The output samples of the aggregator 655 may be subject to various loop-filtering techniques in the loop filter unit 656. Video compression technologies may include in-loop filter technologies that are controlled by parameters included in the coded video bitstream and made available to the loop filter unit 656 as symbols 621 from the parser 620, but may also be responsive to meta-information obtained during the decoding of previous in decoding order parts of the coded picture or coded video sequence, as well as responsive to previously reconstructed and loop-filtered sample values.

The output of the loop filter unit 656 may be a sample stream that may be output to the display 512, which may be for example a render device, as well as stored in the reference picture memory for use in future inter-picture prediction.

Certain coded pictures, once fully reconstructed, may be used as reference pictures for future prediction. Once a coded picture is fully reconstructed and the coded picture has been identified as a reference picture by, for example, parser 620), the current reference picture 658 may become part of the reference picture memory 657, which may be for example a reference picture buffer, and a fresh current picture memory may be reallocated before commencing the reconstruction of the following coded picture.

The video decoder 510 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance may be that the complexity of the coded video sequence is within bounds as defined by the level of the video compression technology or standard. In some cases, levels restrict the maximum picture size, maximum frame rate, maximum reconstruction sample rate measured in, for example mega samples per second, maximum reference picture size, and so on. Limits set by levels may, in some cases, be further restricted through Hypothetical Reference Decoder (HRD) specifications and metadata for HRD buffer management signaled in the coded video sequence.

In an embodiment, the receiver 610 may receive additional redundant data with the encoded video. The additional data may be included as part of the coded video sequence(s. The additional data may be used by the video decoder 510 to properly decode the data and/or to more accurately reconstruct the original video data. Additional data may be in the form of, for example, temporal, spatial, or signal-to-noise ratio SNR enhancement layers, redundant slices, redundant pictures, forward error correction codes, and so on.

Figure 7:
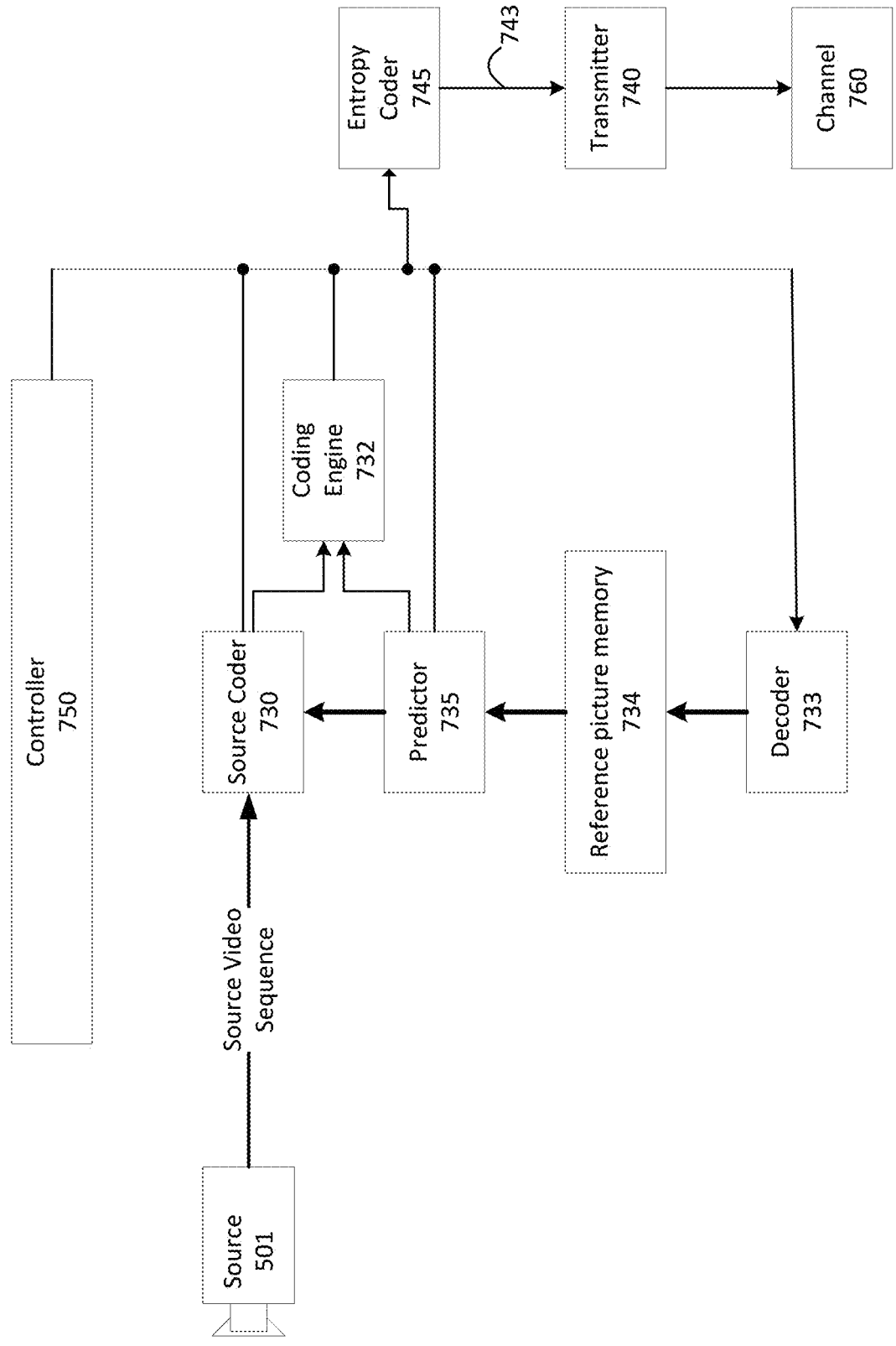
FIG. 7 is a functional block diagram of a video encoder, according to an embodiment of the present disclosure.

FIG. 7 may be a functional block diagram of a video encoder 503 according to an embodiment of the present disclosure.

The encoder 503 may receive video samples from a video source 501 that is not part of the encoder that may capture video images to be coded by the encoder 503.

The video source 501 may provide the source video sequence to be coded by the encoder 503 in the form of a digital video sample stream that may be of any suitable bit depth for example: 8 bit, 10 bit, 12 bit, . . . , any colorspace for example, BT.601 Y CrCB, RGB, . . . and any suitable sampling structure for example Y CrCb 4:2:0, Y CrCb 4:4:4. In a media serving system, the video source 501 may be a storage device storing previously prepared video. In a videoconferencing system, the video source 501 may be a camera that captures local image information as a video sequence. Video data may be provided as a plurality of individual pictures that impart motion when viewed in sequence. The pictures themselves may be organized as a spatial array of pixels, wherein each pixel may comprise one or more samples depending on the sampling structure, color space, etc. in use. A person skilled in the art may readily understand the relationship between pixels and samples. The description below focuses on samples.

According to an embodiment, the encoder 503 may code and compress the pictures of the source video sequence into a coded video sequence 743 in real time or under any other time constraints as required by the application. Enforcing appropriate coding speed is one function of Controller 750. Controller controls other functional units as described below and is functionally coupled to these units. The coupling is not depicted for clarity. Parameters set by controller may include rate control related parameters picture skip, quantizer, lambda value of rate-distortion optimization techniques, . . . , picture size, group of pictures GOP layout, maximum motion vector search range, and so forth. A person skilled in the art may readily identify other functions of controller 750 as they may pertain to video encoder 503 optimized for a certain system design.

Some video encoders operate in what a person skilled in the art readily recognizes as a "coding loop." As an oversimplified description, a coding loop may consist of the encoding part of a source coder 730, which may be for example an encoder, henceforth responsible for creating symbols based on an input picture to be coded, and a reference picture(s), and a local decoder 733 embedded in the encoder 503 that reconstructs the symbols to create the sample data that a remote decoder also would create as any compression between symbols and coded video bitstream is lossless in the video compression technologies considered in the disclosed subject matter. That reconstructed sample stream is input to the reference picture memory 734. As the decoding of a symbol stream leads to bit-exact results independent of decoder location local or remote, the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity and resulting drift, if synchronicity cannot be maintained, for example because of channel errors is well known to a person skilled in the art.

The operation of the local decoder 733 may be the same as of a remote decoder 510, which has already been described in detail above in conjunction with FIG. 6. Briefly referring also to FIG. 7, however, as symbols are available and en/decoding of symbols to a coded video sequence by entropy coder 745 and parser 620 may be lossless, the entropy decoding parts of decoder 510, including channel 612, receiver 610, buffer 615, and parser 620 may not be fully implemented in local decoder 733.

An observation that may be made at this point is that any decoder technology except the parsing/entropy decoding that is present in a decoder also necessarily needs to be present, in substantially identical functional form, in a corresponding encoder. The description of encoder technologies may be abbreviated as they are the inverse of the comprehensively described decoder technologies. Only in certain areas a more detail description is required and provided below.

As part of its operation, the source coder 730 may perform motion compensated predictive coding, which codes an input frame predictively with reference to one or more previously-coded frames from the video sequence that were designated as "reference frames." In this manner, the coding engine 732 codes differences between pixel blocks of an input frame and pixel blocks of reference frame(s that may be selected as prediction reference(s to the input frame.

The local video decoder 733 may decode coded video data of frames that may be designated as reference frames, based on symbols created by the source coder 730. Operations of the coding engine 732 may advantageously be lossy processes. When the coded video data may be decoded at a video decoder not shown in FIG. 7, the reconstructed video sequence typically may be a replica of the source video sequence with some errors. The local video decoder 733 replicates decoding processes that may be performed by the video decoder on reference frames and may cause reconstructed reference frames to be stored in the reference picture memory 734, which may be for example a reference picture cache. In this manner, the encoder 503 may store copies of reconstructed reference frames locally that have common content as the reconstructed reference frames that will be obtained by a far-end video decoder absent transmission errors.

The predictor 735 may perform prediction searches for the coding engine 732. That is, for a new frame to be coded, the predictor 735 may search the reference picture memory 734 for sample data as candidate reference pixel blocks or certain metadata such as reference picture motion vectors, block shapes, and so on, that may serve as an appropriate prediction reference for the new pictures. The predictor 735 may operate on a sample block-by-pixel block basis to find appropriate prediction references. In some cases, as determined by search results obtained by the predictor 735, an input picture may have prediction references drawn from multiple reference pictures stored in the reference picture memory 734.

The controller 750 may manage coding operations of the source coder 730, including, for example, setting of parameters and subgroup parameters used for encoding the video data.

Output of all aforementioned functional units may be subjected to entropy coding in the entropy coder 745. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 740 may buffer the coded video sequence(s as created by the entropy coder 745 to prepare it for transmission via a communication channel 760, which may be a hardware/software link to a storage device which would store the encoded video data. The transmitter 740 may merge coded video data from the source coder 730 with other data to be transmitted, for example, coded audio data and/or ancillary data streams sources not shown.

The controller 750 may manage operation of the encoder 503. During coding, the controller 750 may assign to each coded picture a certain coded picture type, which may affect the coding techniques that may be applied to the respective picture. For example, pictures often may be assigned as one of the following frame types:

An Intra Picture I picture may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture P picture may be one that may be coded and decoded using intra prediction or inter prediction using at most one motion vector and reference index to predict the sample values of each block.

A Bi-directionally Predictive Picture B Picture may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks for example, blocks of 4×4, 8×8, 4×8, or 16×16 samples each and coded on a block-by-block basis. Blocks may be coded predictively with reference to other already coded blocks as determined by the coding assignment applied to the blocks' respective pictures. For example, blocks of I pictures may be coded non-predictively or they may be coded predictively with reference to already coded blocks of the same picture spatial prediction or intra prediction. Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 503 may perform coding operations according to a predetermined video coding technology or standard, such as ITU-T Rec. H.265. In its operation, the encoder 503 may perform various compression operations, including predictive coding operations that exploit temporal and spatial redundancies in the input video sequence. The coded video data, therefore, may conform to a syntax specified by the video coding technology or standard being used.

In an embodiment, the transmitter 740 may transmit additional data with the encoded video. The source coder 730 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The techniques described above, may be implemented as computer software using computer-readable instructions, and physically stored in one or more computer-readable media. For example, FIG. 9 shows a computer system 900 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, screen 810, which may be for example a touchscreen, data-glove 1204, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the screen 810, data-glove 1204, or joystick 805, but there may also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 may also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 may also include interface to one or more communication networks 855. Networks 855 may for example be wireless, wireline, optical. Networks 855 may further be local, wide-area, metropolitan, vehicular and industrial, real-time, delay-tolerant, and so on. Examples of networks 855 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 855 commonly require external network interface adapters 854 that attached to certain general purpose data ports or peripheral buses 849 (such as, for example USB ports of the computer system 800; others are commonly integrated into the core of the computer system 800 by attachment to a system bus 1248 as described below (for example Ethernet interface into a PC computer system or cellular network interface into a smartphone computer system). Using any of these networks 855, computer system 800 may communicate with other entities. Such communication may be uni-directional, receive only (for example, broadcast TV), uni-directional send-only (for example CANbus to certain CANbus devices), or bi-directional, for example to other computer systems using local or wide area digital networks. Certain protocols and protocol stacks may be used on each of those networks 855 and network interfaces such as external network interface adapters 854 as described above.

Aforementioned human interface devices, human-accessible storage devices, and network interfaces may be attached to a core 840 of the computer system 800.

The core 840 may include one or more Central Processing Units (CPU) 841, Graphics Processing Units (GPU) 842, specialized programmable processing units in the form of Field Programmable Gate Areas (FPGA) 843, hardware accelerators for certain tasks 844, and so forth. These devices, along with Read-only memory (ROM) 845, Random-access memory (RAM) 846, internal mass storage such as internal non-user accessible hard drives, solid-state drives (SSDs), and the like 847, may be connected through a system bus 1248. In some computer systems, the system bus 1248 may be accessible in the form of one or more physical plugs to enable extensions by additional CPUs, GPU, and the like. The peripheral devices may be attached either directly to the core's system bus 1248, or through a peripheral bus 849. Architectures for a peripheral bus include peripheral component interconnect (PCI), USB, and the like.

CPUs 841, GPUs 842, FPGAs 843, and accelerators 844 may execute certain instructions that, in combination, may make up the aforementioned computer code. That computer code may be stored in ROM 845 or RAM 846. Transitional data may be also be stored in RAM 846, whereas permanent data may be stored for example, in the internal mass storage 847. Fast storage and retrieve to any of the memory devices may be enabled through the use of cache memory, that may be closely associated with one or more CPU 841, GPU 842, mass storage 847, ROM 845, RAM 846, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, a computer system having the architecture of computer system 800, and specifically the core 840 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 840 that are of non-transitory nature, such as core-internal mass storage 847 or ROM 845. The software implementing various embodiments of the present disclosure may be stored in such devices and executed by core 840. A computer-readable medium may include one or more memory devices or chips, according to particular needs. The software may cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system may provide functionality as a result of logic hardwired or otherwise embodied in a circuit (for example: accelerator 844), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for coding video data using temporal motion vector prediction (TMVP), the method being executed by one or more processors, the method comprising:
    receiving video bitstream comprising one or more pictures;
    determining that the one or more pictures are to be predicted in a regular merge mode or an adaptive motion vector prediction (AMVP) mode;
    obtaining a displacement vector associated with a current block in a current picture, the displacement vector being signaled in the video bitstream to identify a reference block in the current picture;
    determining motion information associated with the reference block based on the displacement vector, the motion information being used as a motion vector predictor (MVP) from a temporal motion vector predictor (TMVP) candidate;
    generating a TMVP candidate list comprising the motion information;
    deriving a motion vector for the current block using the TMVP candidate list; and
    decoding the current block using the derived motion vector for prediction in the regular merge mode or the adaptive motion vector prediction (AMVP) mode.

2. The method of claim 1, wherein the displacement vector indicates at least one respective position of the at least one motion vector predictor in the temporal motion vector predictor candidate list.

3. The method of claim 2, wherein the temporal motion vector predictor candidate list is reordered based on a template matching cost.

4. The method of claim 2, wherein the temporal motion vector predictor candidate list is generated using a pre-defined scan order, and wherein the pre-defined scan order is based on a magnitude of the displacement vector.

5. The method of claim 1, wherein the displacement vector indicates at least one respective displacement vector among the plurality of displacement vectors associated with respective candidates in the temporal motion vector predictor candidate list.

6. The method of claim 1, wherein obtaining the displacement vector is based on an index indicating motion vector difference with motion vector expression techniques.

7. The method of claim 1, wherein obtaining the displacement vector based on an index indicating motion vector difference with adaptive motion vector resolution techniques.

8. The method of claim 7, wherein the displacement vector has a displacement vector resolution in a specific number of samples.

9. The method of claim 8, wherein the displacement vector resolution is signaled in a high level syntax.

10. An apparatus for coding video data using temporal motion vector prediction (TMVP), the apparatus comprising:
    at least one memory configured to store program code; and
    at least one processor configured to read the program code and operate as instructed by the program code, the program code including:
        receiving code configured to cause the at least one processor to receive video bitstream comprising one or more pictures;
        determining code configured to cause the at least one processor to determine that the one or more pictures are to be predicted in a regular merge mode or an adaptive motion vector prediction (AMVP) mode;
        obtaining code configured to cause the at least one processor to obtain obtaining a displacement vector associated with a current block in a current picture, the displacement vector being signaled in the video bitstream to identify a reference block in the current picture;
motion information code configured to cause the at least one processor to determine motion information associated with the reference block based on the displacement vector, the motion information being used as a motion vector predictor (MVP) from a temporal motion vector predictor (TMVP) candidate;
generating configured to cause the at least one processor to generate a TMVP candidate list comprising the motion information;
deriving configured to cause the at least one processor to derive a motion vector for the current block using the TMVP candidate list; and
decoding configured to cause the at least one processor to decode the current block using the derived motion vector for prediction in the regular merge mode or the adaptive motion vector prediction (AMVP) mode.

11. The apparatus of claim 10, wherein the displacement vector indicates at least one respective position of the at least one motion vector predictor in the temporal motion vector predictor candidate list.

12. The apparatus of claim 11, wherein the temporal motion vector predictor candidate list is reordered based on a template matching cost.

13. The apparatus of claim 11, wherein the temporal motion vector predictor candidate list is generated using a pre-defined scan order, and wherein the pre-defined scan order is based on a magnitude of the displacement vector.

14. The apparatus of claim 10, wherein the displacement vector indicates at least one respective displacement vector among the plurality of displacement vectors associated with respective candidates in the temporal motion vector predictor candidate list.

15. The apparatus of claim 10, wherein obtaining the displacement vector is based on an index indicating motion vector difference with motion vector expression techniques.

16. The apparatus of claim 10, wherein obtaining the displacement vector based on an index indicating motion vector difference with adaptive motion vector resolution techniques.

17. The apparatus of claim 16, wherein the displacement vector has a displacement vector resolution in a specific number of samples.

18. A non-transitory computer-readable medium storing instructions, the instructions comprising: one or more instructions that, when executed by one or more processors of a device for coding video data using temporal motion vector prediction (TMVP), cause the one or more processors to:
receive video bitstream comprising one or more pictures;
determine that the one or more pictures are to be predicted in a regular merge mode or an adaptive motion vector prediction (AMVP) mode;
obtain a displacement vector associated with a current block in a current picture, the displacement vector being signaled in the video bitstream to identify a reference block in the current picture;
determine motion information associated with the reference block based on the displacement vector, the motion information being used as a motion vector predictor (MVP) from a temporal motion vector predictor (TMVP) candidate;
generate a TMVP candidate list comprising the motion information;
derive a motion vector for the current block using the TMVP candidate list; and
decode the current block using the derived motion vector for prediction in the regular merge mode or the adaptive motion vector prediction (AMVP) mode.

19. The non-transitory computer-readable medium of claim 18, wherein the displacement vector indicates at least one respective position of the at least one motion vector predictor in the temporal motion vector predictor candidate list.

20. The non-transitory computer-readable medium of claim 18, wherein the displacement vector indicates at least one respective displacement vector among the plurality of displacement vectors associated with respective candidates in the temporal motion vector predictor candidate list.

* * * * *